US012765582B2

(12) United States Patent
Sat et al.

(10) Patent No.: US 12,765,582 B2
(45) Date of Patent: Oct. 20, 2026

(54) APPARATUS AND METHOD FOR PREPARING PUFFED FOOD

(71) Applicant: TUTTIPUFFS LTD., Sde-Nechemia (IL)

(72) Inventors: Zemer Sat, Kibbutz Hulata (IL); Gilad Aharonson, Kibbutz Sde-Nechemia (IL)

(73) Assignee: TUTTIPUFFS LTD., Sde-Nechemia (IL)

(*) Notice: Subject to any disclaimer, the term of this patent is extended or adjusted under 35 U.S.C. 154(b) by 657 days.

(21) Appl. No.: 18/041,753

(22) PCT Filed: Aug. 19, 2021

(86) PCT No.: PCT/IL2021/051016
§ 371 (c)(1),
(2) Date: Feb. 15, 2023

(87) PCT Pub. No.: WO2022/038613
PCT Pub. Date: Feb. 24, 2022

(65) Prior Publication Data

US 2023/0292799 A1 Sep. 21, 2023

(30) Foreign Application Priority Data

Aug. 19, 2020 (IL) .......................................... 276821

(51) Int. Cl.
*A23L 7/165* (2016.01)
*A23P 30/36* (2016.01)

(52) U.S. Cl.
CPC ............... *A23L 7/165* (2016.08); *A23P 30/36* (2016.08)

(58) Field of Classification Search
CPC . A23L 5/17; A23L 7/161; A23L 7/165; A23L 7/174; A23L 7/178; A23P 30/10;
(Continued)

(56) References Cited

U.S. PATENT DOCUMENTS 2,954,296 A 9/1960 Clausi
3,189,940 A * 6/1965 Hughes .................. A22C 11/02 452/43

(Continued)

FOREIGN PATENT DOCUMENTS

CA 2 346 964 8/2000
CN 1223100 A 7/1999

(Continued)

OTHER PUBLICATIONS

National Agricultural Library; "How Does Popcorn Pop?"; United States Department of Agriculture; Sep. 7, 2015; https://web.archive.org/web/20150907012043/https://www.nal.usda.gov/exhibits/speccoll/exhibits/show/popcorn/how-does-popcorn-pop- (Year: 2015).*

(Continued)

*Primary Examiner* — Viren A Thakur
*Assistant Examiner* — Austin Parker Taylor
(74) *Attorney, Agent, or Firm* — Meitar Patents Ltd.; Daniel Kligler

(57) ABSTRACT

Apparatus and method for preparing a puffed food product. At least one profood item is placed within a compartment defining a sealed enclosure. The profood item comprises a shell, and an interior contained within the shell, the interior comprising a foodstuff comprising at least one starch, and a liquid adapted to form a vapor when subjected to heating. The pressure in the compartment is rapidly reduced with a pressure device, while heating the compartment, until the profood item reaches breakage threshold conditions at reduced breakage temperature, causing a rupturing of the shell, inducing a sudden release of the vapor at a high pressure, resulting in puffing of the starch to produce the puffed food product. The reduced breakage temperature may be in the range of 200-220° C. The pressure reduction may
(Continued)

take place in less than 1 second. The puffing process duration may be in the range of 6-7 seconds.

6 Claims, 8 Drawing Sheets

(58) Field of Classification Search
CPC .......... A23P 30/30; A23P 30/32; A23P 30/36; A23P 30/38; A47J 27/08
USPC .................... 426/445, 447, 512; 99/454, 472
See application file for complete search history.

(56) References Cited

U.S. PATENT DOCUMENTS

| | | | | | |
|---|---|---|---|---|---|
| 3,224,109 | A | 12/1965 | Turato | | |
| 4,068,007 | A | 1/1978 | Forkner | | |
| 4,525,367 | A | 6/1985 | Allison | | |
| 5,080,914 | A | 1/1992 | Birch et al. | | |
| 5,102,679 | A | 4/1992 | Whalen et al. | | |
| 5,108,772 | A | 4/1992 | Wilbur | | |
| 5,740,817 | A * | 4/1998 | Cunningham | A24B 3/182 | 131/296 |
| 6,171,631 | B1 | 1/2001 | Willoughby et al. | | |
| 6,460,451 | B1 * | 10/2002 | Helman | A23L 7/187 | 99/323.5 |
| 2003/0159591 | A1 * | 8/2003 | Evans, Sr. | A23L 7/187 | 99/323.5 |
| 2005/0142262 | A1 * | 6/2005 | Johnson | A23L 7/165 | 426/440 |
| 2008/0131567 | A1 * | 6/2008 | Lemme | F04B 35/04 | 426/418 |
| 2008/0233256 | A1 * | 9/2008 | Quinn | A47J 27/08 | 426/450 |
| 2010/0009055 | A1 * | 1/2010 | Ramirez | A23P 30/20 | 426/496 |
| 2011/0305800 | A1 | 12/2011 | Iannazzo et al. | | |
| 2013/0251877 | A1 * | 9/2013 | Levin | A23L 19/19 | 426/450 |

FOREIGN PATENT DOCUMENTS

| | | | | | |
|---|---|---|---|---|---|
| CN | 204354362 | U | | 5/2015 | |
| CN | 106261457 | A | * | 1/2017 | A23B 2/57 |
| GB | 986176 | A | | 3/1965 | |
| GB | 2399274 | A | * | 9/2004 | A23P 30/10 |
| JP | 56-135469 | A | | 3/1983 | |
| JP | S5840057 | A | | 3/1983 | |
| JP | S59156273 | A | * | 9/1984 | |
| JP | S62294056 | A | | 12/1987 | |
| JP | H0149473 | B2 | | 10/1989 | |
| JP | H05227892 | A | | 9/1993 | |
| JP | H06113780 | A | | 4/1994 | |
| JP | H11127809 | A | | 5/1999 | |
| JP | 2002-536987 | A | | 11/2002 | |
| JP | 2010519925 | A | | 6/2010 | |
| KR | 100890238 | B1 | | 3/2009 | |
| KR | 20150095750 | A | | 8/2015 | |
| WO | WO 2000/49894 | | | 8/2000 | |
| WO | 03068005 | A1 | | 8/2003 | |
| WO | WO 2003/068005 | A1 | | 8/2003 | |
| WO | WO 2010/132650 | A1 | | 11/2010 | |

OTHER PUBLICATIONS

Busch Vacuum Solutions; “Energy-efficient and reliable vacuum supply”; Jul. 5, 2017; https://www.buschvacuum.com/us/en/success-stories/energy-efficient-and-reliable-vacuum-supply.html?language=EN&country=US&countryCode=+1&channel=Organic%20Search:%20google&clientId=GA1.1.1236203.1757533603 (Year: 2017).*

Kruszelnicki, Karl; “Popcorn”; Australian Broadcasting Corporation; Jul. 13, 2000; https://web.archive.org/web/20000713003305/https://www.abc.net.au/science/k2/homework/s95612.htm (Year: 2000).*

International Search Report issued Dec. 28, 2021 in connection with PCT International Application No. PCT/IL2021/051016.

Written Opinion of the International Searching Authority issued Dec. 28, 2021 in connection with PCT International Application No. PCT/IL2021/051016.

International Preliminary Report on Patentability issued Dec. 21, 2022 in connection with PCT International Application No. PCT/IL2021/051016.

Extended European Search Report, # PCT/IL2021/051016, dated Jan. 17, 2024.

JP Office Action, Appl. No 2023-512386, dated May 20, 2025.

KIPO Office Action (Notice of Reasons for Rejection), KR patent application No. 10-2023-7005827, dated Nov. 17, 2025.

JPO Office Action (Notice of Reasons for Rejection), JP patent application No. 2023-512664, dated Aug. 26, 2025.

English translation of JPO Office Action (Notice of Reasons for Rejection), JP patent application No. 2023-512664, dated Aug. 26, 2025.

List of References, U.S. Appl. No. 18/041,942, dated Nov. 26, 2025.

English translation of KIPO Office Action (Notice of Reasons for Rejection), KR patent application No. 10-2023-7005828, dated Nov. 17, 2025.

KIPO Office Action (Notice of Reasons for Rejection), KR patent application No. 10-2023-7005828, dated Nov. 17, 2025.

English translation of KIPO Office Action (Notice of Reasons for Rejection), KR patent application No. 10-2023-7005827, dated Nov. 17, 2025.

* cited by examiner

APPARATUS AND METHOD FOR PREPARING PUFFED FOOD

CROSS-REFERENCE TO RELATED APPLICATIONS

This application is a § 371 national stage of PCT International Application No. PCT/IL2021/051016, filed Aug. 19, 2021, claiming priority of Israeli Patent Application No. 276821, filed Aug. 19, 2020, the entire contents of each of which are hereby incorporated by reference into the subject application.

FIELD OF THE INVENTION

The present invention generally relates to food products, and particularly to puffed food products and methods for their preparation.

BACKGROUND OF THE INVENTION

Puffed foods can be found in a variety of commercial food products accessible in supermarkets and grocery stores, including different types of snacks, chips, and breakfast cereals. These puffed foods come in various shapes, sizes and textures, and are made from a basic foodstuff item which expands in volume and puffs up when heated. More specifically, puffed food preparation entails subjecting a foodstuff, such as a natural grain (e.g., wheat, rice, corn) or previously prepared micropellets (typically containing various food flours), to heating, usually concurrent with a pressure escalation, for a relatively brief duration (e.g., several seconds or minutes). As internal pressure in the heated foodstuff is intensified, naturally contained water or moisture is converted into vapor. The heating also causes naturally contained biopolymer compounds characterized by thermoplastic properties, such as starch, to become soft and pliable. Eventually the internal pressure reaches a critical point (Pc) resulting in a forceful explosion and sudden expansion of the contained biopolymer material (e.g., starch). The dynamics of this explosion at the critical point is dependent on various factors, including the internal pressure of the basic foodstuff item, the pressure differential (ΔP) between the external and internal pressures, the process temperature, the time exposure to heat, and other variables. Following the explosion and the rapid release of pressure, the foodstuff matrix rapidly cools, lowering the temperature such that the biopolymer or starch is solidified, leaving it in a puffy, porous, expanded and loose arrangement.

For example, one of the most common and well-known puffed foods is popcorn. A popcorn kernel contains a starchy endosperm contained within a shell or hull. Upon heating of the kernel, the endosperm moisture transforms into steam and the steam pressure gradually intensifies until the shell ruptures, and the starch and proteins of the endosperm expand into a foamy material, which then rapidly cools and takes on a puffed form. Puffed foods may be prepared from a single foodstuff, but may include additional ingredients and additives to enhance flavor and entice the consumer. Some puffed food products may form a shell or crust due to the heating, such as with bread.

The raw ingredients may be formed into desired shapes prior to heating, such as via an extrusion or pressing process. The heating of the puffing foodstuff may be performed by baking or frying, using conventional heating utensils and appliances, such as an oven, a pan or a lidded pot, or using specially designated devices, such as a puffing machine with pressing molds. In a conventional baking process, expansion of the ingredients usually results from an external leavening agent, such as yeast in bread dough, which instigates the emission of gas bubbles within the dough. Accordingly, the expansion generally takes place prior to the actual baking stage (i.e., before the dough is placed in the oven) and at the very beginning of baking. In contrast, expansion of a puffing foodstuff results from internal elements, specifically water or moisture naturally contained within the basic foodstuff item. This moisture reaches a vapor state upon heating and subsequently generates sufficient pressure required to initiate expansion of the contained starches. Therefore, the preparation of puffed foods does not require a lengthy waiting period for foodstuff expansion prior to the heating and pressing stages.

Certain basic foodstuffs can be used to prepare puffed foods in a straightforward process and without requiring specially designated machines or devices. For example, popcorn can be prepared relatively quickly and conveniently at the comfort of one's home from readily available popcorn kernels that can be heated in a pot or in a bag. Yet other types of puffed foods, such as certain snacks and cereals that tend to be popular with young children, need to be produced by commercial manufacturers in designated facilities. While there are many existing foodstuff items, techniques, and devices for preparation of puffed food items, the types and varieties of puffed foods can be greatly expanded beyond those currently available.

Some conventional puffing processes are based on vacuum frying. Vacuum frying is readily implemented in large-scale industrial production processes and is characterized with relatively low energy consumption. Vacuum frying has been successfully applied to processing of fruits and vegetables, but is not suitable for puffing most other foodstuffs and is generally considered an unhealthy form of processing due to very high edible oil levels in the final product.

Non-frying puffing processes can be divided into three categories: vacuum freeze-drying, differential pressure puffing (also known as "air puffing" or "variable temperature puffing"), and microwave puffing.

A vacuum freeze-drying process involves freezing water-containing foodstuffs, and subsequent heating in a vacuum state to directly sublimate the water from a solid state to a gaseous state. The entire production process is required to take place at a low temperature and in a vacuum state, below approximately −25° C. Disadvantages of this process includes a high energy consumption and a long production cycle, resulting in costs which may exceed three to four times that of fried puffed food products.

A differential pressure puffing process, as applied to fruits and vegetables, uses an expansion tank, and a vacuum storage tank that is about 5-10 times larger than the expansion tank. The expansion tank is heated by a steam boiler, and a vacuum pump and vacuum storage tank provide a negative pressure environment. The vacuum storage tank and the expansion tank are connected through a vacuum valve. The pressure control range of the expansion tank is generally between 0.06 MPa to −0.08 MPa, and the temperature control range is generally between 0° C. to 120° C. The water or moisture contained in the preprocessed raw materials (e.g., fruit or vegetable foodstuffs) is continuously evaporated in the evaporation tank by steam heating to generate water vapor, and causing the pressure within the evaporation tank to rise continuously. When a certain pressure level is reached, the vacuum valve is opened, reducing the pressure and evaporation the water/moisture inside the raw materials. This produces a strong vapor pressure differential, resulting in swelling of the cells and tissues of the foodstuffs, followed by expansion and puffing. However, the temperature distribution in the tank tends to be uneven, and the puffing of the final product tends to be limited to a less than desirable extent.

Microwave puffing, which can also be applied to fruits and vegetables, refers to the emission of high frequency electromagnetic waves after the microwave equipment is energized. However, due to the influence of microwave wavelength, power and processing time, the quality is difficult to control, and microwave puffing cannot yet be used as the only production technique.

Microwave pressure differential puffing is a composite technology designed to overcome the defects of the microwave puffing and the differential pressure puffing processes applied separately. Essentially, a microwave pre-expansion step is added before the differential pressure expansion in a differential pressure puffing process. A microwave pressure differential puffing may overcome the problem of "coking" in a microwave process, and the hard problems in a differential pressure process. Combined to get better results, the puffing efficient using microwave pressure differential puffing may be fairly high, however the technique is generally unsuitable for high-fiber fruits and vegetables.

Conventional puffed food preparation devices generally operate by compressing a large number of micropellets (or other basic foodstuff) in a contained volume, and applying heat until the temperature reaches a high enough level to generate sufficient pressure to initiate rupturing of the micropellet shell and expansion of the contained starches. The required temperature level may need to be significantly high in some cases, typically around 160-165° C. Examples of puffed food preparation devices and methods known in the art are disclosed in: Chinese Patent Application No. 106539115A to Univ Yanan, entitled: "Air-compression microwave-heating explosion puffing device and method"; U.S. Pat. No. 5,562,021 to Slanick, entitled: "Device for preparing grain cakes"; Canadian Patent No. 2,346,964 to Malfait, entitled: "Puffed food starch product"; and U.S. Pat. No. 4,281,593 to Gevaert, entitled: "Device for preparing food products from cooked and expanded cereals and products obtained".

SUMMARY OF THE INVENTION

In accordance with one aspect of the present invention, there is thus provided an apparatus for preparing a puffed food product. The apparatus includes a compartment, defining a sealed enclosure, a pressure device, configured to modify pressure within the compartment, and a heating device, configured to modify temperature within the compartment. The compartment is operative to receive at least one profood item comprising a shell, and an interior contained within the shell, the interior comprising a foodstuff comprising at least one starch, and a liquid adapted to form a vapor when subjected to heating. The pressure device is configured to rapidly reduce the pressure in the compartment while the heating device heats the compartment, until the profood item reaches breakage threshold conditions at reduced breakage temperature, causing a rupturing of the shell, inducing a sudden release of the vapor at a high pressure, resulting in puffing of the starch to produce the puffed food product. The reduced breakage temperature may be in the range of: 200° C.-220° C. The reduction of pressure in the compartment may take place in less than 1 second. The duration of the puffing process may be in the range of: 6-7 seconds. The compartment may include at least one mold, where the profood item is placed in a respective mold, and where the mold is sized or shaped to induce a selected size or shape of the puffed food product. Rapidly reducing pressure in the compartment may include simultaneously reducing direct pressure by ceasing application of pressure to the profood item and removing air from the compartment. The apparatus may further include a temperature regulator, configured to regulate the temperature in the compartment. The reduction of pressure may be performed only after the shell is fully formed. The reduction of pressure in the compartment immediately follows an increasing of pressure in the compartment. The pressure device may include at least one of: a vacuum pump; a vacuum piston; a valve in fluid communication with the compartment; and an accumulator connected to and in fluid communication with the vacuum pump and the valve, where reducing the pressure in the compartment is allowed by operating the pump and opening the valve. The apparatus may further include a screening device, situated between the compartment and the pressure device and configured to prevent passage of the profood item or portions thereof from the compartment to the pressure device.

In accordance with another aspect of the present invention, there is to thus provided a method for preparing a puffed food product. The method includes the procedure of placing at least one profood item within a compartment defining a sealed enclosure, the profood item comprising a shell, and an interior contained within the shell, the interior comprising a foodstuff comprising at least one starch, and a liquid adapted to form a vapor when subjected to heating. The method further includes the procedure of rapidly reducing the pressure in the compartment with a pressure device, while heating the compartment, until the profood item reaches breakage threshold conditions at reduced breakage temperature, causing a rupturing of the shell, inducing a sudden release of the vapor at a high pressure, resulting in puffing of the starch to produce the puffed food product. The reduced breakage temperature may be in the range of: 200° C.-220° C. The reduction of pressure in the compartment may take place in less than 1 second. The duration of the puffing process may be in the range of: 6-7 seconds. The profood item may be placed in a respective mold in the compartment, where the mold is sized or shaped to induce a selected size or shape of the puffed food product. Rapidly reducing pressure in the compartment may include simultaneously reducing direct pressure by ceasing application of pressure to the profood item and removing air from the compartment. The reduction of pressure may be performed only after the shell is fully formed. The reduction of pressure in the compartment immediately follows an increasing of pressure in the compartment.

BRIEF DESCRIPTION OF THE DRAWINGS

The present invention will be understood and appreciated more fully from the following detailed description taken in conjunction with the drawings in which.

DETAILED DESCRIPTION OF THE EMBODIMENTS

Figure 1A:
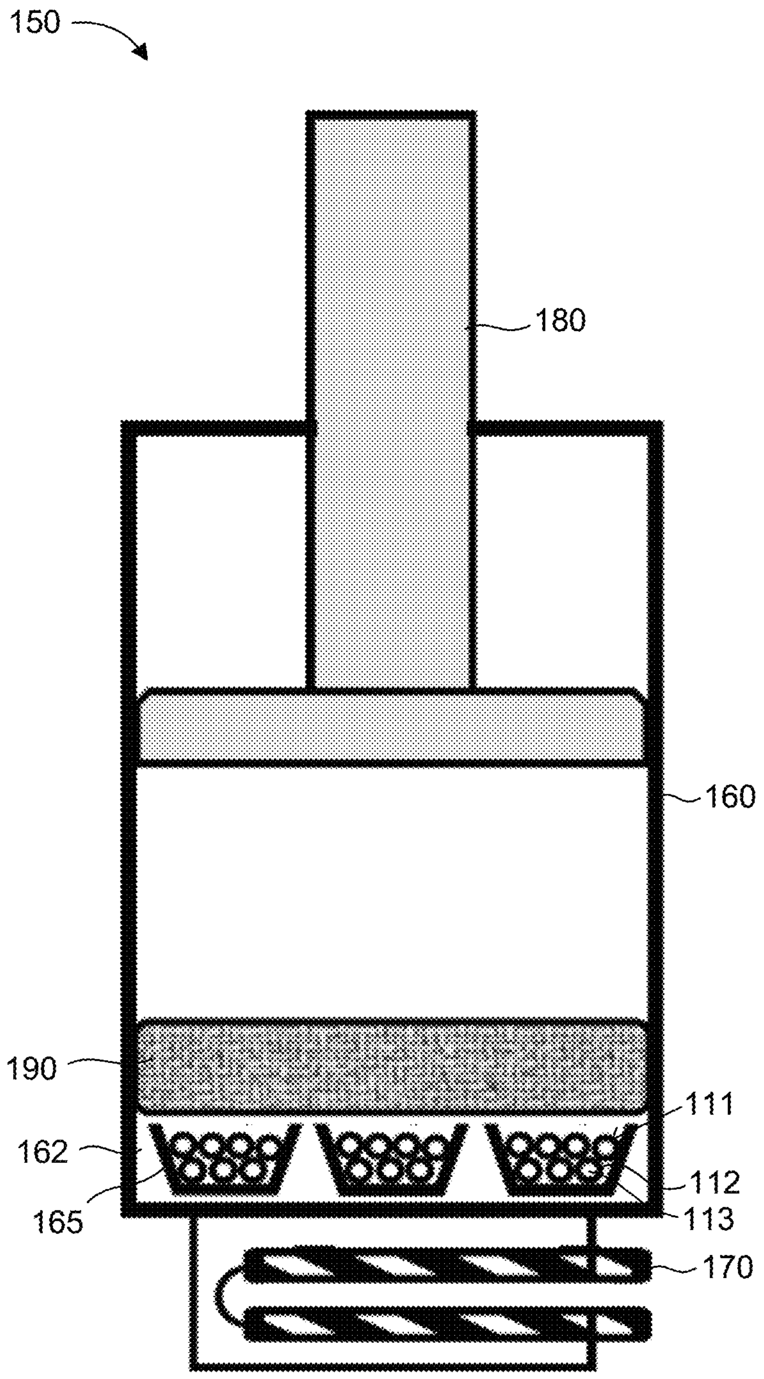
FIG. 1A is an illustration of an apparatus for preparation of a puffed food product, in a first stage of operation, constructed and operative in accordance with an embodiment of the present invention.

The present invention overcomes the disadvantages of the prior art by providing a novel apparatus and method for preparing puffed food products. The disclosed apparatus resembles existing conventional apparatuses for puffed food preparation but includes a pressure device, such as a vacuum pump or piston, configured to apply a sudden vacuum within the container during heating, allowing for the shell rupturing process and subsequent puffing to be performed at a lower temperature and at shorter cycle times than in conventional apparatuses. The disclosed apparatus may also include a screen to prevent escape of foodstuff particles and averting possible contamination or impairment of the pressure device. The disclosed apparatus and method may significantly improve the efficiency of the puffing process by substantially reducing the preparation time. Furthermore, the heating temperature is significantly reduced, minimizing degradation of nutritional content and flavoring of the puffed food product. The required pressure is also significantly reduced, minimizing energy expenditures and costs. Finally, the disclosed apparatus and method may significantly broaden the scope of foodstuffs and food sources capable of being prepared into an edible puffed food product.

The term "profood item" is used herein to refer to any processed or unprocessed food substance, which may be prepared from one or more raw materials ("foodstuffs"), which is not limited to known food items, and which may be used to prepare a "puffed food product" directly, i.e., such that no supplemental ingredients may need to be added to the profood item in order to prepare the puffed food therefrom.

The term "foodstuff" is used herein to refer to any processed or unprocessed food substance which may be used to prepare a "profood item".

The terms "puffed food" and "puffed food product" are used herein to refer to any food product prepared from a "profood item" in a puffing preparation process (e.g., involving heating and/or internal pressure escalation) and which is characterized by a puffed formation, such as a foamy, fluffy, expanded, "sponge like" configuration, of one or more food substances.

The terms "pellet" and "micropellet" are used interchangeably herein to refer to a small pellet, tablet or capsule, which may form at least part of a "profood item".

The term "compartment" as used herein refers to a distinct section of a structure or container, or a mold or mold cavity, in which selected items can be kept separate from other items within the container, such as a section including one or more mold cavities.

The term "treatment", and grammatical variations thereof, as used herein in the context of profood item preparation, such as in preparing the profood shell, refers to the employment of force or energy, such as heat (e.g., via cooking) and/or mechanical force (e.g. by means of a mixer or a fluid bed), and/or one or more chemical processes which may or may not alter the chemical composition of an outer layer of a foodstuff, and may alter at least one property of the foodstuff, such as applying a coating to a micropellet, and/or otherwise causing one or more outer layers to have increased hardness and rigidity relative to one or more inner layers of the foodstuff.

The term "user" is used herein to refer to any individual person or group of persons operating a device, apparatus or system or performing a method or process of the disclosed embodiments, such as a puffed food preparation method.

In the discussion unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the specification and claims is considered to be the "inclusive or" rather than the "exclusive or", and indicates at least one of, or any combination of items it conjoins.

Figure 1B:
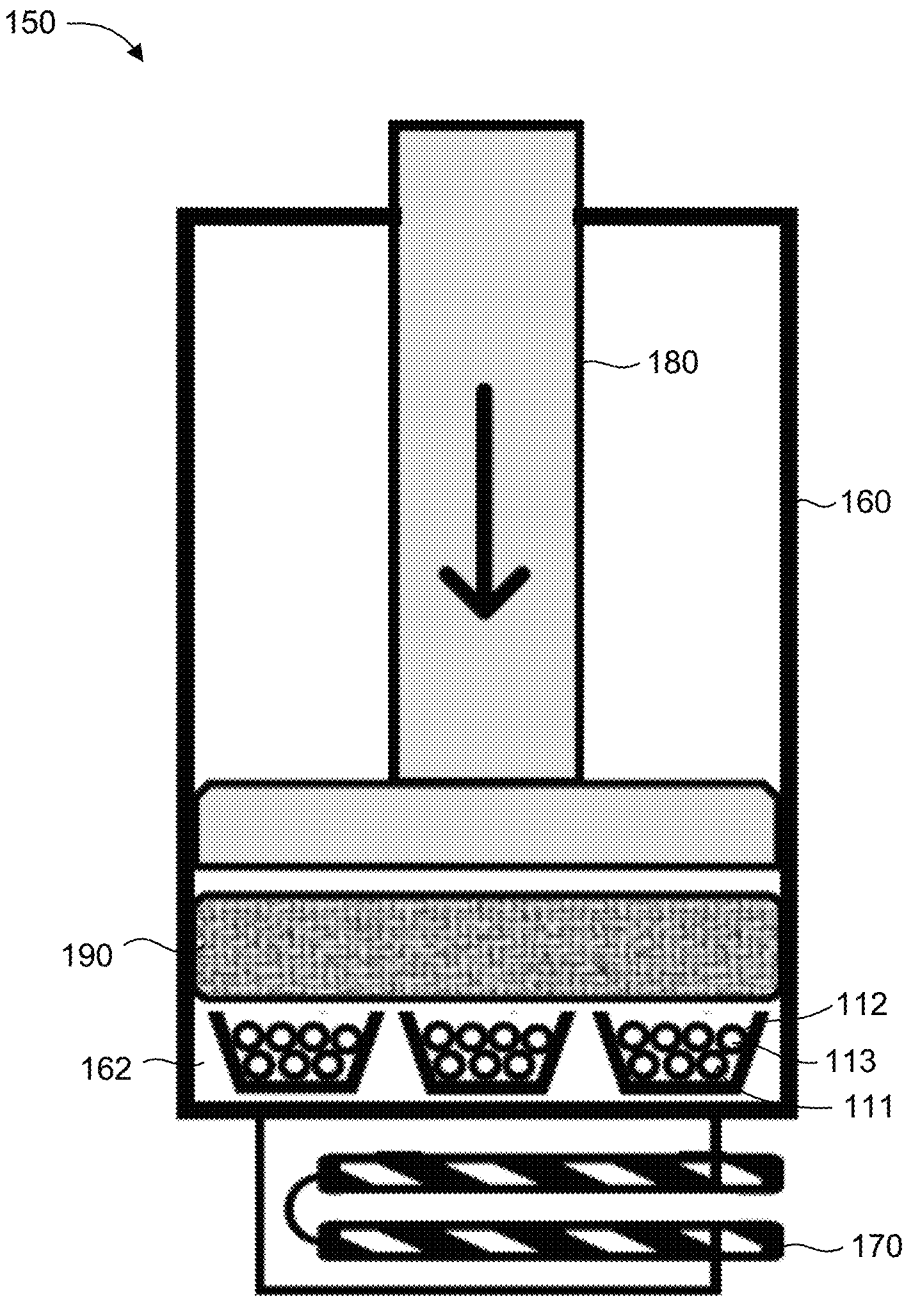
FIG. 1B is an illustration of the apparatus of FIG. 1A for preparation of a puffed food product, in a second stage of operation, constructed and operative in accordance with an embodiment of the present invention.
Figure 1C:
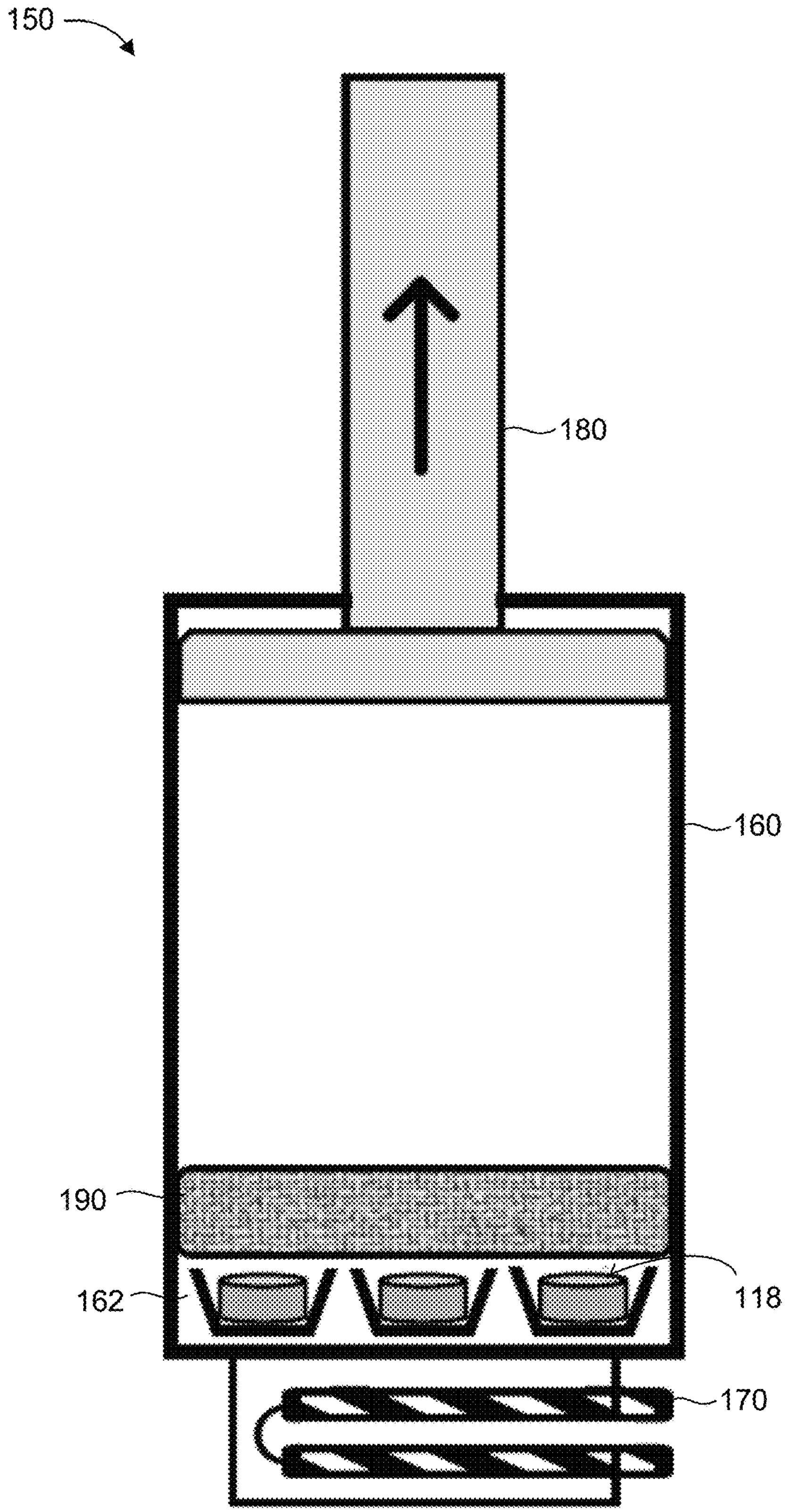
FIG. 1C is an illustration of the apparatus of FIG. 1A for preparation of a puffed food product, in a third stage of operation, constructed and operative in accordance with an embodiment of the present invention.

Reference is now made to FIGS. 1A, 1B and 1C, which are schematic illustrations of an apparatus, generally referenced 150, for preparation of a puffed food product, constructed and operative in accordance with an embodiment of the present invention. FIG. 1A depicts apparatus 150 in a first stage of operation, FIG. 1B depicts apparatus 150 in a second stage of operation, and FIG. 1C depicts apparatus 150 in a third stage of operation. Apparatus 150 includes a container 160 with at least one compartment 162. Apparatus 150 further includes a heating device 170, a pressure device 180, and an optional screening device 190.

Container 160 is configured to receive a plurality of profood items, referenced 111, placed within sealable compartment 162. Heating device 170 is configured to apply heat to compartment 162, and may be positioned adjacent to a wall or surface of compartment 162, such as underneath a bottom surface of compartment 160. For example, heating device 170 may be embodied by a portion of a stovetop or cooktop, such as a gas burner or an induction hob, or an open flame. Heating device 170 may include one or more electrical resistance heating elements located in the container walls, or integrated into a mold assembly (if such an assembly is used). Heating device 170 may apply heating through any suitable mechanism, including but not limited to: radiation; thermal conduction; magnetic induction; electrical heating; and the like.

Pressure device 180 is configured to increase or decrease the pressure within compartment 162, and may be positioned adjacent to a wall or surface of compartment 162, such as above an upper surface of compartment 160, or otherwise linked to compartment. Pressure device 180 may be embodied, for example, by an industrial vacuum pump with a valve leading into compartment 162, where pressure within compartment 162 can be selectively increased or decreased by operating the vacuum pump and opening the valve, such as to selectively allow gases or fluid to flow into or out of the compartment (resulting in a pressure differential). An accumulator may be coupled with the vacuum pump and valve to maintain and control the fluid flow.

Screening device 190 is positioned between compartment 162 and pressure device 180 and is configured to prevent foodstuff particles from escaping from compartment 162 and entering pressure device 180, which may lead to contamination and/or impair the functioning of pressure device 180. Screening device 190 may be embodied by at least one separator, including but not limited to one or more of: a grid, a screen, a filter, a dust collector, a gravitational or pressure differential separator, and combinations thereof. The separator may be removable and serviceable to facilitate the removal of proofood item particles or foodstuff substances from or in the separator.

Apparatus 150 may optionally include and/or be associated with additional components not shown in the Figures for enabling the implementation of the disclosed subject matter.

Figure 2:
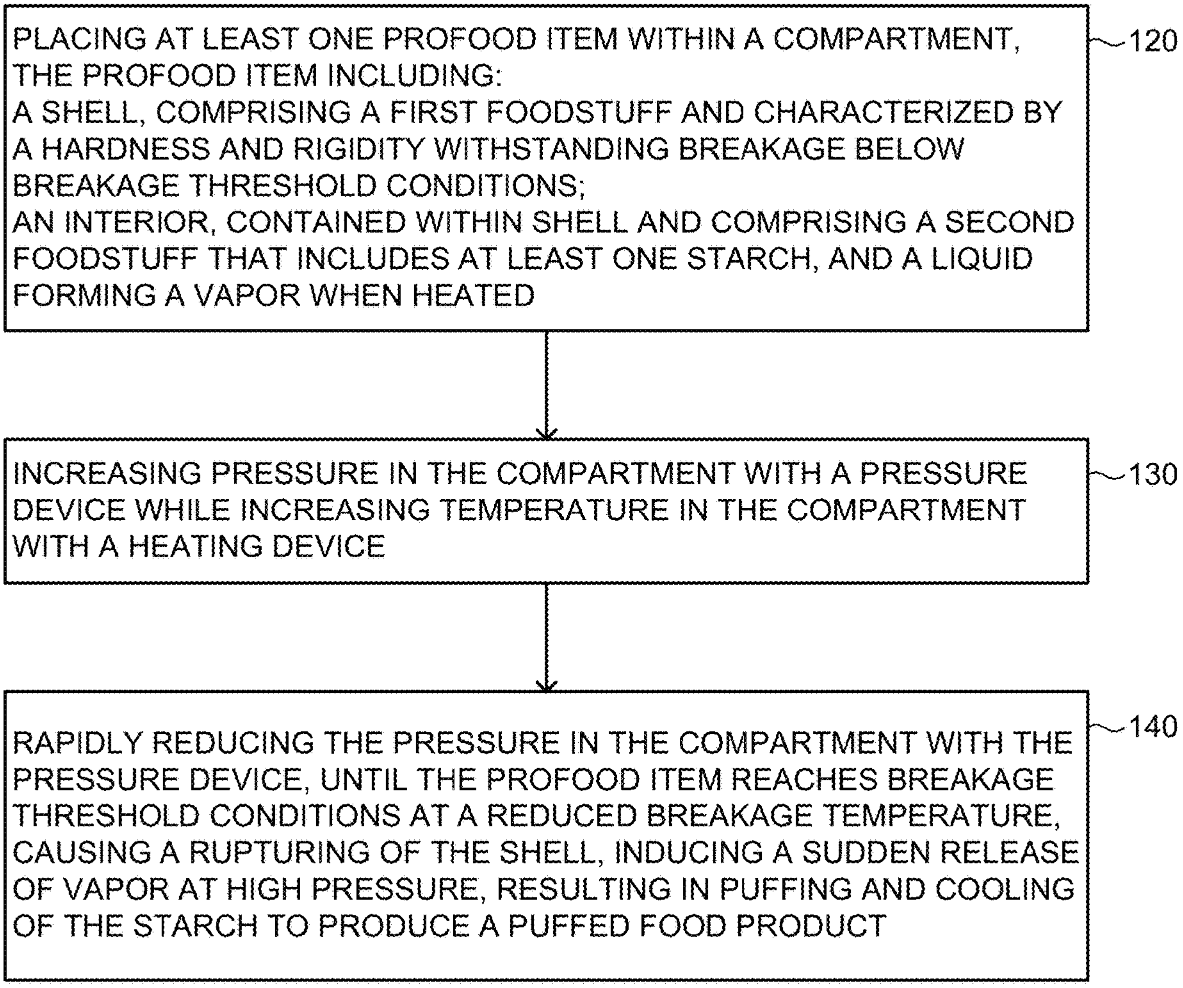
FIG. 2 is a flow diagram of a method for preparing a puffed food product, operative in accordance with an embodiment of the present invention.

Reference is now made to FIG. 2, which is a flow diagram of a method for preparing a puffed food product, operative in accordance with an embodiment of the present invention. In procedure 120, a profood item is placed within a compartment. The profood item includes a shell and an interior. The shell includes a first foodstuff and is characterized by a hardness and rigidity able to withstand breakage below certain temperature and pressure threshold conditions. The interior is contained within the shell and includes a second foodstuff. The second foodstuff includes at least one starch and a liquid, such as water, adapted to form a vapor when heated. Referring to FIG. 1A, a user places one or more profood items 111 within compartment 162 of container 160. Each profood item 111 includes an outer shell 112 encasing an interior 113, and may be in the form of a coated micropellet. The profood items 111 may be placed within respective molds within compartment 162, such as mold 165, of predefined shape and size, and used in conjunction with a pressing mechanism, so as to induce a selected shape and/or size of the subsequently produced puffed food. For example, a metal mold may be situated in a hydraulic press, with electrical resistance heating elements located in the walls of the mold (similar to injection molding), where the heating elements are controlled by controllers such as a thermocouple (TC) sensor attached at a suitable point to detect the actual temperature. Alternatively, the profood items 111 may be placed directly in compartment 162 without utilizing a dedicated mold (in which case compartment 162 essentially functions as a mold cavity). For example, profood items that are granular may need to be aggregated and thus may be placed into molds, or into one or more designated cavities, whereas large profood items, such as whole fresh fruit, may be placed in a shell containing a significant amount of starch (e.g., at least 15% w/w of the shell) and prepared in compartment 162 without a mold. The filling of molds 165 may be important to ensure the integrity and intended shape of the final puffed food product. Furthermore, compartment 162 may be filled so as to leave minimal superfluous space within the compartment 162, in order to facilitate a rapid onset of the requisite pressure decrease during the preparation process as quickly as possible, for providing a proper and consistent shaped final puffed food product.

When proofood items 111 are placed in compartment, apparatus 150 is initialized such that the temperature and pressure conditions in container 160 and compartment 162 are at default settings. For example, heating device 170 may be operating continuously and the heat regulated at a constant temperature by a regulator, while the pressure is at standard atmospheric pressure (i.e., room pressure) when pressure device is not applied.

In a next optional procedure 130, the pressure in the compartment is increased with a pressure device, while the temperature in the compartment is increased with a heating device. Referring to FIG. 1B, pressure device 180 is employed to gradually increase pressure in compartment 162, while substantially concurrently, heating device 170 is employed to gradually increase the temperature in compartment 162. For example, when using electrical resistance heating elements then the temperature is constant and regulated throughout, and when using induction or microwave heating then the temperature is varied on demand. The pressure increase or decrease is generally as rapid as possible, typically less than 0.2 seconds, and not longer than 1.0 second. Alternatively, if compartment 162 is effectively sealed then the pressure increase in compartment 162 may be achieved by raising the internal temperature using heating device 170 provided there is a sufficient moisture content. Profood items 111 in compartment 162 are subject to increasing temperature and pressure levels (also by mechanical pressing in the cavity), leading to the formation of vapor from the moisture content in profood interior 113. The heating of profood item 111 also causes a softening of the thermoplast biopolymer elements e.g., starch, in profood interior 113. It is noted that procedure 130 is optional, and pre-pressing is not required for all foodstuffs and conditions.

In procedure 140, the pressure in the compartment is rapidly reduced with the pressure device, until the profood item reaches breakage threshold conditions at a reduced breakage temperature, causing a rupturing of the shell, inducing a sudden release of vapor at high pressure, resulting in puffing and cooling of the starch to produce a puffed food product. Referring to FIG. 1C, pressure device 180 is employed to suddenly decrease the pressure in compartment 162, such as by rapidly hydraulically or pneumatically pulling a piston or vacuum pump of pressure device 180 or by opening a valve to a connected vacuum accumulator connected to a vacuum pump, while heating device 180 maintains or increases the temperature in compartment 162. The sudden pressure decrease takes place over a very brief period and may briefly result in a vacuum or near vacuum conditions. The sudden pressure reduction in compartment 162 may be implemented by simultaneously reducing direct pressure by ceasing the application of pressure to the profood items and removing air from the compartment.

Following the sudden pressure drop in compartment 162, the profood items 111 within compartment 162 reach "breakage threshold" conditions at which the profood shell 112 breaks or ruptures due to the elevated vapor pressure. This occurs at a temperature level which is substantially lower than standard "shell breakage temperatures" for conventional puffing processes, such as between 210-220° C. The rupturing of the profood shell 112 is followed by an expansion and foaming of the first foodstuff and starch substances of profood interior 113. The first foodstuff starches then rapidly cool and develop a puffed configuration to produce a puffed food item 118, as the starch and other materials in the profood interior 113 readily expanding and then rapidly cooling down helps to create an expanded foodstuff matrix. Each puffed food item 118, which may be in the form of an edible puffed cake that can be consumed as a snack, is typically created from multiple smaller micro-pellets.

The breakage may be achieved when the mold is abruptly opened and the pressure is rapidly released. The puffing expansion continues in the open air as the water vapor continues to escape the material matrix. The entire process from start to finish may be approximately 6-7 seconds, including the opening and closing of the molds (which take up the majority of the duration). A typical pressing time is between 0.1-2.0 seconds, depending on the material.

The amount or quantity of profood items initially placed within compartment 162 (or within molds therein) may be selected to ensure that the total volume of puffed foods produced, during a given production session or cycle, is sufficient to occupy most or all of the available space within compartment 162.

Compartment 162 may be characterized with a substantially low spatial volume, such that the pressure change (decrease) is substantially rapid, which may facilitate the process causing second foodstuff to suddenly rupture the profood shell 112 and enhance the puffing thereof, as compared with puffing performed by conventional systems with commercially available foodstuffs amendable to puffing. As the rapid expansion creates a sudden pressure drop in the compartment and/or mold, the pressure difference (ΔP) is higher, and induces the rupturing of the shell/coating. Furthermore, this characteristic may allow for puffing of novel types of profood items beyond conventional and commercially available foodstuffs, as the vacuum pressure can be created in the compartment and/or mold, so a higher pressure difference (ΔP) can be achieved and thus expansion and puffing can be induced even in materials or foodstuffs that do not tend to puff easily. The resulting puffed product may be crispier and airier than conventional puffed foods and may have a greater surface area, yet still lighter weight (e.g. less than 1 gram) in comparison to dense unpuffed crackers made from similar foodstuffs, and thus more pleasing and highly satiating.

It is appreciated that the shell rupturing at a lower temperature may provide the benefits of reducing energy consumption in the puffing process and minimizing associated costs, as well as avoiding exposure of the proofood items to high temperatures which can be harmful and/or introduce unhealthy additives into the final puffed food product. The higher the process temperature, the larger the degradation of nutritional qualities in the final product. The disclosed puffing process of the present invention reduces the process temperature by approximately 40-60° C. relative to that of conventional puffing processes, thereby significantly minimizing nutritional degradation. Furthermore, a longer cycle time results in greater exposure to higher temperatures and a greater degradation of nutritional qualities. The disclosed puffing process of the present invention also reduces the cycle time by at least 30%-40% relative to that of conventional puffing processes, thereby significantly minimizing nutritional degradation.

In contrast to commercially available apparatuses and processes for puffing foods, the apparatus and method of the present invention employs a strong suction simultaneously with reducing mechanical pressure applied by the press on the profood in the mold. In particular, suddenly reducing pressure in the compartment involves simultaneously reducing direct pressure on the profood items while suction air from the compartment, where "direct pressure" denotes that the press is in physical contact with the profood items and the pressure on the profood items is applied directly through this contact. The enhanced pressure drop is considered to instigate a sharp pressure gradient across the profood shells 112, which may significantly improve the puffing performance and may result in several benefits. Firstly, this enables puffing of foodstuffs that ordinarily would not be amenable to puffing. For example, the profood item may include all natural ingredients, such as a combination of 50% legumes and 50% vegetable materials. Furthermore, the reduction in heating temperature of the profood items significantly reduces degradation of the nutritional content and/or flavor of the final puffed food product. In addition, the required pressure to be applied by the pressing device may be reduced, such as up to about half of that required in conventional puffing processes (which may help save energy/power expenditures). Finally, the overall preparation time may be significantly reduced, such that a single preparation cycle is completed much quicker and improving efficiency. For example, the entire process from start to finish may be approximately 6-7 seconds, including the opening and closing of the molds (which take up the majority of the duration), such that the cycle time is reduced by 30%-40% relative to conventional processes. The shorter cycle time and lower process temperatures also provide economic benefits in the form of lower energy consumption and higher efficiency (in terms of number of units produced during a given time period).

The disclosed apparatus is configured to allow the pumping of air from the compartment within 10-100 milliseconds. The speed or duration of the pressure reduction is dependent upon the amount of air within the compartment, the power of the suction, the geometry (i.e., total volume of air in compartment, unusable volumes, etc) and dimensions of the apparatus components, including pipe section dimensions and limiting factors, as will be readily appreciated by those skilled in the art. The pressure inside the compartment may be reduced from atmospheric pressure of about 100 kPa to approximately 3-20 kPa. For example, the resultant pressure in the compartment after the (abrupt) pressure reduction may be between 10-20 kPa. In another example, the compartment pressure after the (abrupt) pressure reduction is approximately 3-5 kPa.

Pressure device 180 may include a vacuum pump capable of providing a rapid and strong pressure reduction. For example, pressure device 180 may include a vacuum pump connected to compartment 162 via a vacuum accumulator and a vacuum valve operationally coupled to the accumulator and compartment 162. Such an arrangement allows the pump to operate continuously, and the sub-pressure is "stored" in the accumulator. The valve allows selectively applying and terminating the sub-pressure as needed and pre-determined in accordance with the type and amount of profood items and the operating stage in the puffing process.

According to an embodiment, heating of compartment 162 may be applied prior to the sudden pressure decrease in order to form the profood shell 112 of proofood item 111 when producing the profood item 111 from its basic components. Accordingly, the abrupt reduction of pressure may be performed after the profood shell 112 is fully formed (unless the pellets have a shell or coating that was formed earlier. In particular, the profood item 111 is heated until a shell 112 is formed around the interior 113, where the shell 112 is substantially harder than the interior 113. Subsequent to or concomitant to forming the shell 112, the pressure device 180 is employed to reduce pressure in compartment

162. The heating device 170 (that may be in continuous operation) is then employed again to heat the profood item 111 at least until the foodstuffs and starch of the profood interior 113 expands and vapor pressure rises to cause breakage of the shell 112.

Alternatively, the profood shell may be formed before the profood items are placed in compartment 162 of apparatus 150. The profood shell may generally be formed using any suitable device or process, including but not limited to: a coating process; a co-extrusion process; spraying; fluid bed; surface treatments; an injection or co-injection process; coating drums; and the like. The (abrupt) pressure reduction may be performed after the profood shell 112 is fully formed.

According to an embodiment of the present invention, pressure is applied to the profood items prior to the (abrupt) reduction in pressure. This application of pressure may be utilized in conjunction with heating to facilitated the formation of the profood shell 112. The application of pressure may be performed using pressure device 180.

The application of a sub-pressure may be employed immediately after the application of pressure, thus creating a particularly large change in pressure in the compartment that can help the profood items to explode and puff. This initial heating and positive pressure may aid in building up pressure inside the profood shell from the creation of pressurized steam therein, let off by the second foodstuff (contained in profood item). When the pressure in the compartment is sharply reduced there is a large difference in pressures within versus without the shell, which leads to explosion of the shell. Compositions such as starches within the second foodstuff rapidly cross-link or otherwise solidify as the shell shatters and thus create a puffed up food item.

Pressure device 180 may be heat isolated or insulated from compartment 162 for protection. For example, a wall of compartment 162 adjacent to pressure device 180 may include heat-insulating materials. Alternatively or additionally, air pumped by pressure device 180 from compartment 162 may pass through a cold-trap (not shown) that can trap the vapours expelled from the profood items and minimize their contact with pressure device 180. Alternatively or additionally, pressure device 180 may be adapted or include components configured to reduce direct contact of pumped hot gasses with the pressure device, such as a Venturi pump.

Apparatus 150 optionally includes a screening device 190, for preventing passage of profood items 111, or foodstuff particles thereof, from compartment 162 to pressure device 180. Screening device 190 may be situated between compartment 162 and pressure device 180, and may include one or more separators, such as at least one of a grid; a screen; a filter; and/or a dust collector. Screening device 190 can help prevent escape of food particles from compartment 162 to pressure device 180, which as a result might become a hotbed of contamination and/or impair the functioning of pressure device 180. The separator may be removable and serviceable to facilitate the removal of proofood item particles or foodstuff substances from or in the separator.

Note that the correct amount of material in profood items 111 (e.g., the size or mass of profood items 111) should be carefully estimated and dosed before placing the profood items 111 in compartment 162, in order to ensure that the amount is sufficient to produce the expanded puffed food product. On the other hand, if the amount is too large then the profood items 111 might not fully expand or might saturate screening device 190. Each kind of profood item 111 may have a unique range of optimal amounts which may be empirically determined and dosed accordingly.

The amount or quantity of profood items initially placed within compartment 162 (or within molds therein) may be selected to ensure that the total volume of puffed foods produced, during a given production session or cycle, is sufficient to occupy most or all of the available space within compartment 162.

Compartment 162 may be characterized with a substantially low spatial volume, such that the pressure decrease is substantially rapid, and causing a stronger pressure differential, which may facilitate the process causing second foodstuff to suddenly rupture the profood shell 112 and enhance the puffing thereof, as compared with puffing performed by conventional systems with commercially available foodstuffs amendable to puffing. Furthermore, this characteristic may allow for puffing of novel types of profood items, as a stronger pressure differential provides a more powerful expansion of the foodstuff matrix. The resulting puffed product may be crispier and airier than conventional puffed foods and may have a greater surface area, yet still lighter weight (e.g. less than 1 gram) in comparison to dense unpuffed crackers made from similar foodstuffs, and thus more pleasing and highly satiating.

Figure 3:
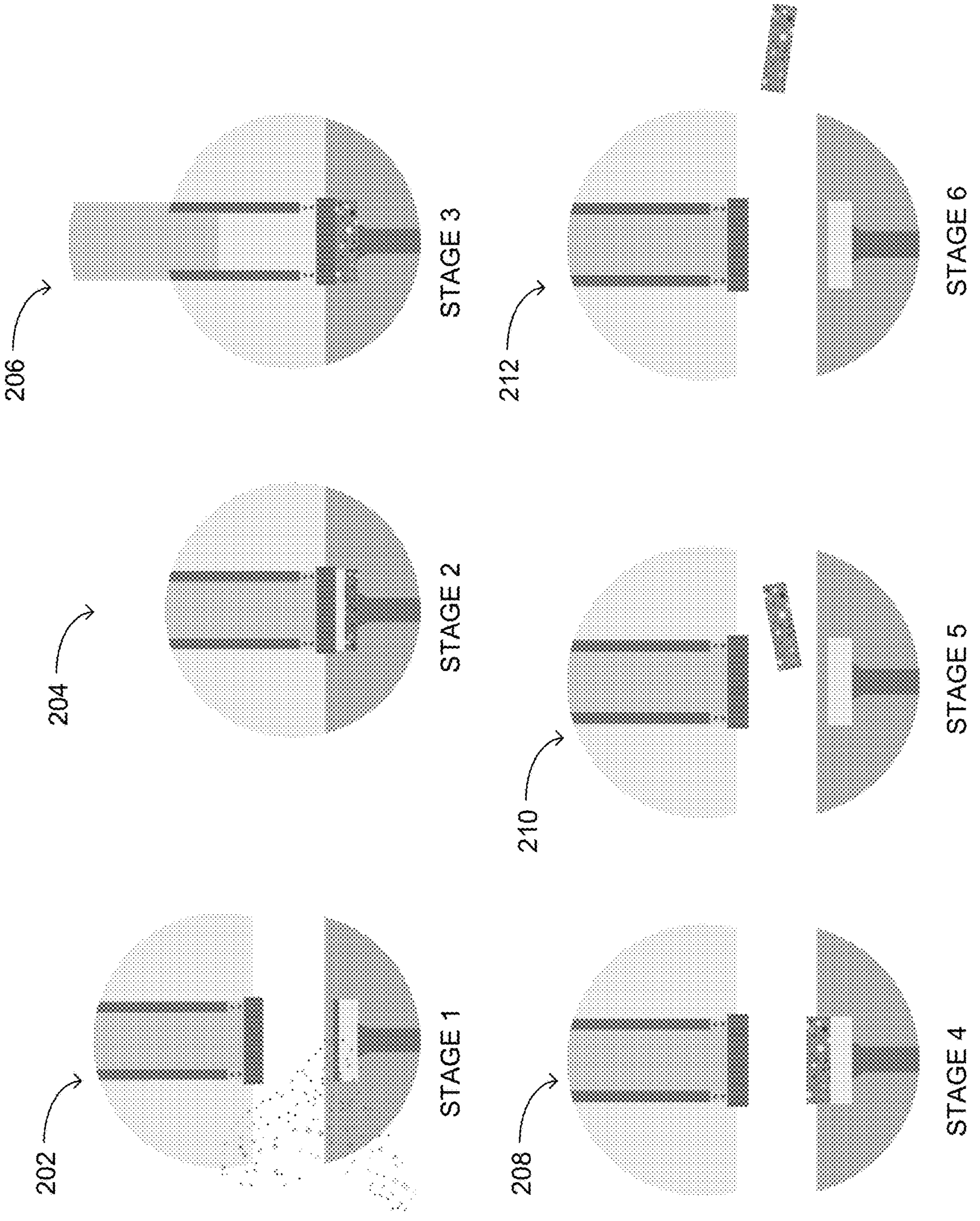
FIG. 3 is an illustration of sequential operational stages of an apparatus for preparation of a puffed food product, operative in accordance with another embodiment of the present invention.
Figure 4A:
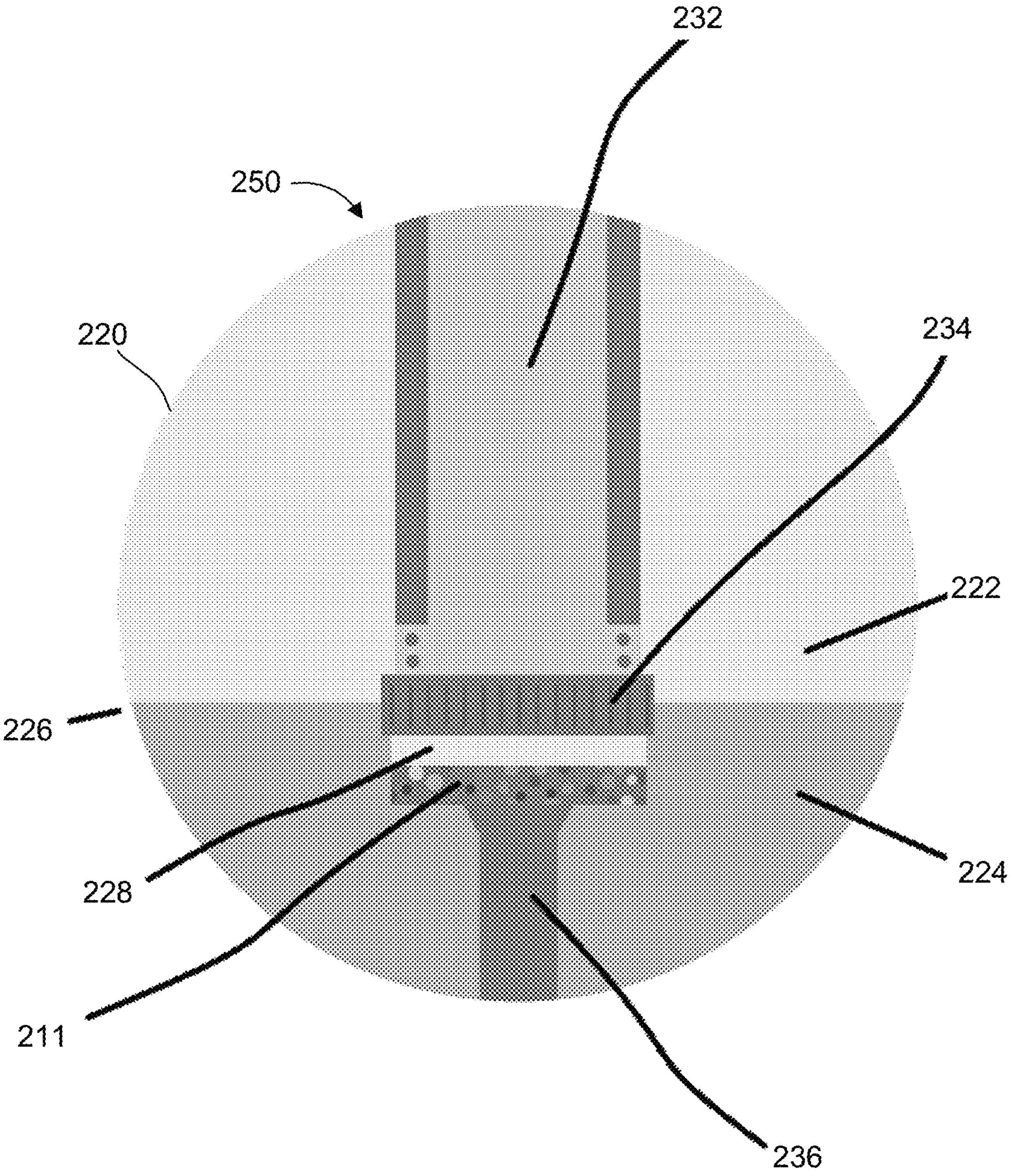
FIG. 4A is a detailed view of an apparatus for preparation of a puffed food product during a second operating stage, constructed and operative in accordance with another embodiment of the present invention.
Figure 4B:
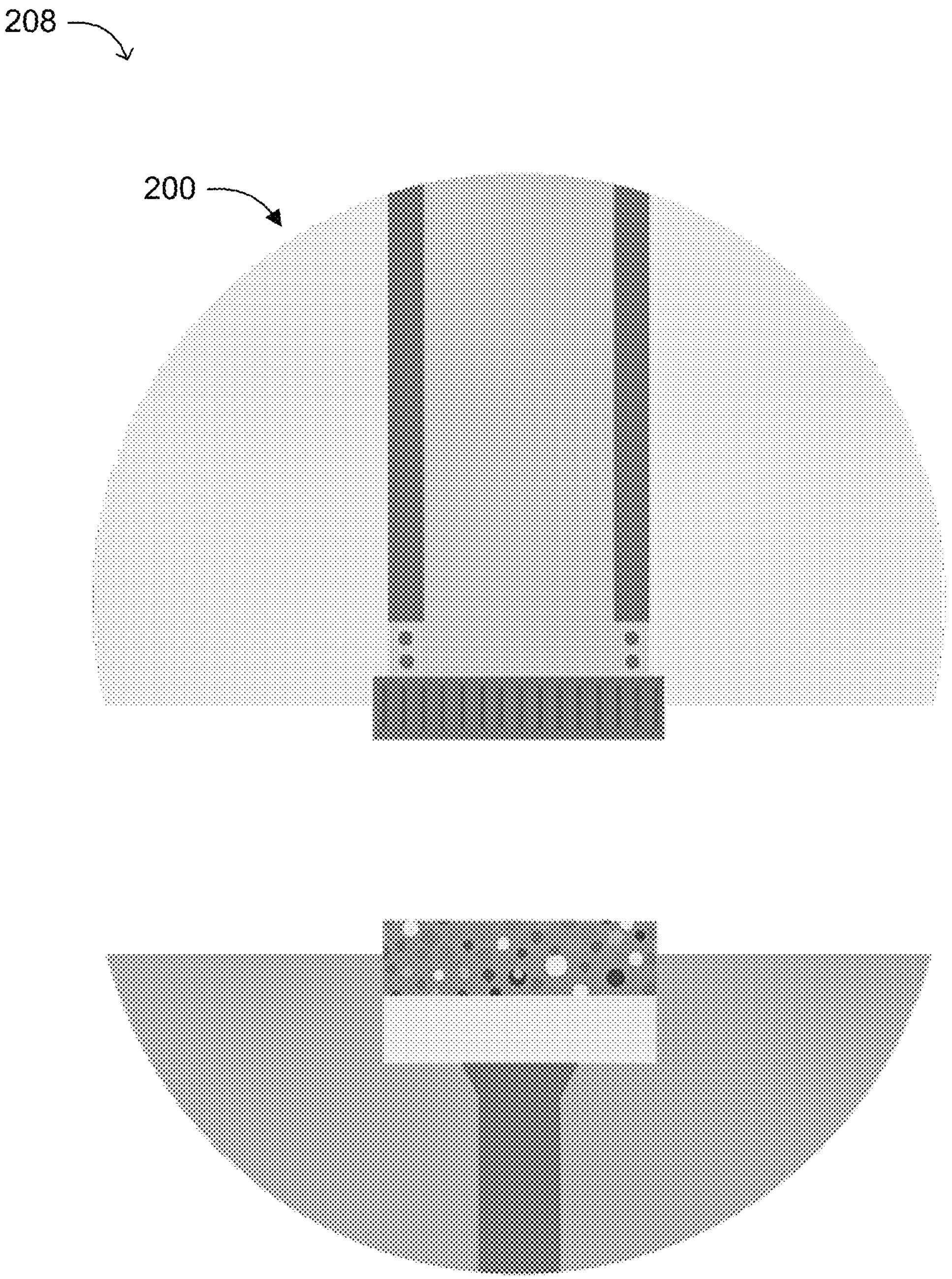
FIG. 4B is a detailed view of an apparatus for preparation of a puffed food product during a fourth operating stage, constructed and operative in accordance with another embodiment of the present invention.

Reference is now made to FIGS. 3, 4A and 4B. FIG. 3 is an illustration of sequential operational stages of an apparatus, referenced 250, for preparation of a puffed food product, constructed and operative in accordance with another embodiment of the present invention. FIG. 4A is a detailed view of apparatus 250 during a second operating stage (referenced 204), and FIG. 4B is a detailed view of apparatus 250 during a fourth operating stage (referenced 208). Referring to FIG. 4A, apparatus 250 includes a mold 220 made up of an upper mold half 222 and a lower mold half 224 separated by a parting line 226. Apparatus 250 further includes a heatable cavity 228, a vacuum piston 232, a filter screen 234, and an ejector 236. Heatable cavity 228 may be heated using electric resistance heating elements (not shown) integrated into mold 220.

In a first operating stage 202 of the puffing preparation process, mold 220 is opened, and profood items 211 (e.g., in the form of coated micropellets) are placed within cavity 228.

In a second operating stage 204 of the puffing preparation process, mold 220 is closed and sealed to the external environment. Pressure is applied to the profood items 211 in cavity [to hasten the heating of pellets contained in cavity 228. The pressure application may be achieved by mechanical pressing of the mold components, in addition to an (optional) application of pressure using vacuum piston 232. Vacuum piston 232 is positioned at a default position ready to initiate an abrupt pressure drop in cavity 228.

In a third operating stage 206 of the puffing preparation process, vacuum piston 232 is deployed, such as by being pulled abruptly, while maintaining mold 220 closed, so as to initiate a rapid pressure drop in cavity 228. The outer shell of each profood item 211 ruptures, inducing the abrupt release of vapor pressure built up within the profood item 211, which is vented through fitler screen 234 into the vacuum chamber. The foodstuff and starches contained within the profood item 211 expands and foams and begins to solidify.

In a fourth operating stage 208 of the puffing preparation process (depicted in detailed view in FIG. 4B), the foodstuff and starches contained within each profood item 211 cools and solidifies, to produce a respective puffed food product. Mold 220 is opened to allow the extraction of the puffed food products with ejector 236. Vacuum piston 232 is returned to its default position and ready for the subsequent production cycle.

In a fifth operating stage 210 of the puffing preparation process, the puffed food products are ejected by ejector 236.

In a sixth operating stage 212 of the puffing preparation process, the puffed food products are forwarded to a packaging or an assembly process, to be packaged and merchandised, and apparatus 250 is initialized and ready for the next puffing process cycle.

Figure 5:
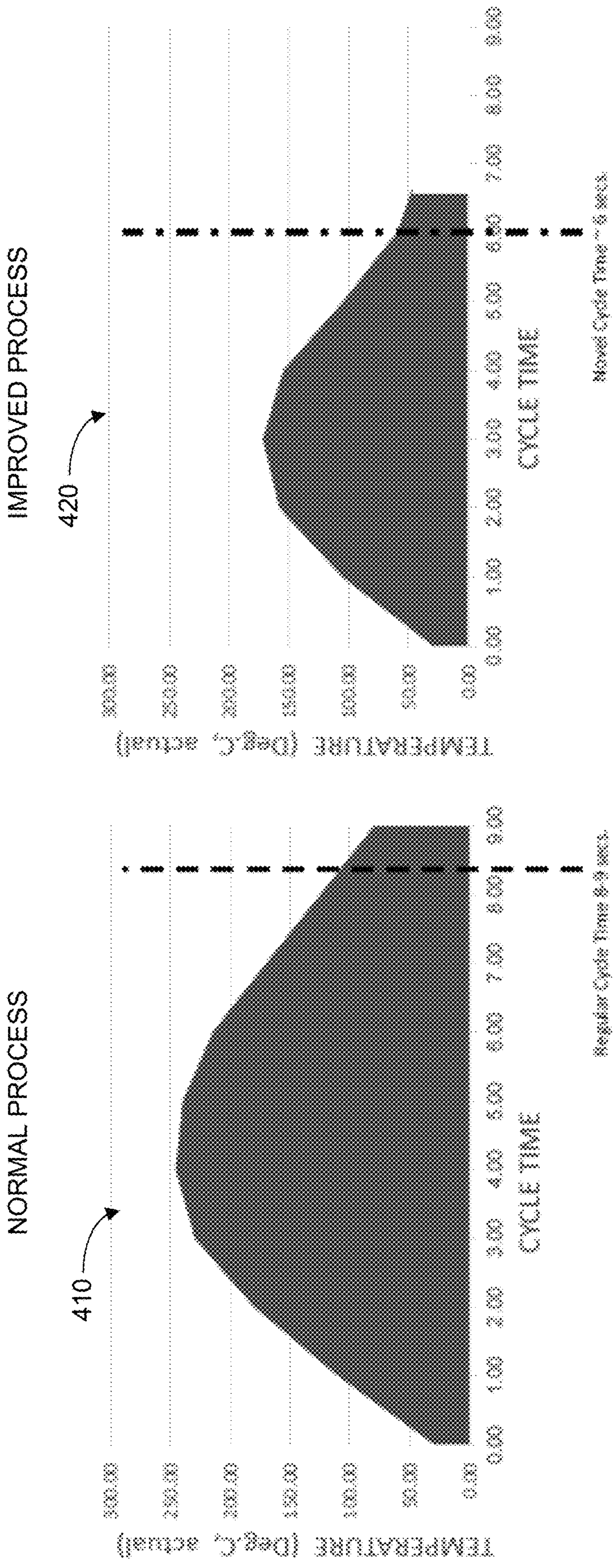
FIG. 5 is a schematic illustration comparing the nutritional degradation profile of a commercial puffing process and puffed food product (left) with the nutritional degradation profile of the disclosed puffing process and puffed food product in accordance with embodiments of the present invention (right).

Reference is made to FIG. 5, which is a schematic illustration comparing the nutritional degradation profile, generally referenced 410, of a commercial puffing process and puffed food product, with the nutritional degradation profile, generally referenced 420, of the disclosed puffing process and puffed food product in accordance with embodiments of the present invention. Graphs 410, 420 schematically depict the degradation of the nutritional content as a function of temperature and cycle time combined. The y-axis of graphs 410, 420 represents the process temperature. The higher the process temperature, the greater the degradation of nutritional qualities. The x-axis of graphs 410, 420 represents the cycle time or process time. The longer the cycle time, the more exposure to high temperatures, and the greater the degradation of the nutritional qualities. The total nutritional degradation is represented by the cross-hatched area, between the curve and the baseline. Graph 420 represents an exemplary puffing process of the present invention using a coated micropellet (i.e., having a shell) and vacuum enhanced puffing.

It is evident from graphs 410, 420 that the exemplary puffing process of the present invention reduces process temperatures by about 50-60 degrees Celsius and thus significantly minimizes nutritional degradation. Furthermore, the exemplary puffing process of the present invention reduces the cycle time by at least 30-40%, thus significantly minimizing nutritional degradation. The accumulated effect of reduction of process temperatures and cycle time is tremendous, as can be observed by the difference in the cross hatched areas of graph 420 relative to graph 410. Accordingly, the puffing process of the present invention clearly shows a nutritional degradation reduced to roughly 40-60% compared to the degradation extent present in conventional or commercial puffing processes, thereby providing a more nutritious puffed food product. Moreover, a shorter cycle time and lower process temperatures provide economic benefits in the form of lower energy consumption and higher efficiency (in terms of number of units produced during a given time period).

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for preparing a puffed food product, the method comprising the procedures of:

placing at least one profood item within a compartment defining a sealed enclosure, the compartment comprising a pressure and containing the profood item and the profood item comprising: a shell; and an interior contained within the shell, the interior comprising a foodstuff comprising at least one starch, and a liquid adapted to form a vapor when subjected to heating;

providing a pressure device comprising: a vacuum pump; a vacuum piston; a valve in fluid communication with the compartment; and an accumulator connected to and in fluid communication with the vacuum pump and the valve;

increasing the pressure in the compartment containing the profood item in less than one second by allowing air flow into the compartment using the vacuum pump and the valve or by using the vacuum piston or by raising internal temperature in the compartment using a heating device; and then immediately reducing the increased pressure in the compartment to a pressure between 3-20 kPa by operating the vacuum pump and opening the valve to pump air from the compartment within 10-100 milliseconds, while heating the compartment, until the shell ruptures at a reduced breakage temperature, releasing the vapor and puffing the foodstuff to produce the puffed food product.

2. The method of claim 1, wherein the reduced breakage temperature is in the range of: 200° C.-220° C.

3. The method of claim 1, wherein the duration from the placing of the profood item in the compartment to the producing of the puffed food product is in the range of: 6-7 seconds.

4. The method of claim 1, wherein the profood item is placed in a mold in the compartment, wherein the mold is sized or shaped to induce a selected size or shape of the puffed food product.

5. The method of claim 1, further comprising regulating the temperature in the compartment with a temperature regulator, wherein the heating device continuously heats the compartment, and wherein the compartment is initialized to default temperature and pressure conditions comprising pressure at standard atmospheric pressure and heat regulated at a constant temperature by the temperature regulator.

6. The method of claim 1, wherein the vacuum pump operates continuously, and the accumulator stores sub-pressure generated by the vacuum pump, and wherein the valve selectively applies the stored sub-pressure to the compartment.

* * * * *